(12) United States Patent
Toratani et al.

(10) Patent No.: US 6,715,368 B1
(45) Date of Patent: Apr. 6, 2004

(54) ROTATION SENSOR (75) Inventors: Tomoaki Toratani, Tokyo (JP); Toshiro Yamamoto, Tokyo (JP); Hiroshi Morimoto, Tokyo (JP); Akira Noguchi, Tokyo (JP); Kosuke Yamawaki, Tokyo (JP); Toshiaki Yasujima, Zama (JP); Yukiaki Tsukamoto, Zama (JP)

(73) Assignees: The Furukawa Electric Co., Ltd., Tokyo (JP); Tokyo Cosmos Electric Co., Ltd., Tokyo (JP)

( * ) Notice: Subject to any disclaimer, the term of this patent is extended or adjusted under 35 U.S.C. 154(b) by 0 days.

(21) Appl. No.: 10/336,991

(22) Filed: Jan. 6, 2003

(30) Foreign Application Priority Data

Oct. 11, 2002 (JP) ........................................ 2002-299218

(51) Int. Cl.[7] .............................. G01F 1/20; G01F 1/32
(52) U.S. Cl. .................................. 73/862.325; 73/862.22
(58) Field of Search ............................................. 73/862

(56) References Cited

U.S. PATENT DOCUMENTS

| 3,924,207 A | * | 12/1975 | Simoni ...................... 333/81 R |
| 4,055,375 A | | 10/1977 | Ogawa et al. |
| 4,086,510 A | | 4/1978 | Watanabe |
| 4,447,752 A | | 5/1984 | Boyce et al. |
| 4,866,993 A | * | 9/1989 | Schumacher ............ 73/862.325 |
| 4,922,761 A | * | 5/1990 | Onishi et al. ........... 73/862.325 |
| 5,311,666 A | | 5/1994 | Jacobsen et al. |
| 5,350,955 A | | 9/1994 | Street |
| 5,693,993 A | | 12/1997 | Ito et al. |
| 5,712,574 A | | 1/1998 | Street |
| 5,763,793 A | | 6/1998 | Ng et al. |
| 5,837,908 A | | 11/1998 | Ng et al. |
| 6,198,191 B1 | | 3/2001 | Chen et al. |
| 6,291,914 B1 | * | 9/2001 | Mukaiyama ............... 310/68 B |
| 6,378,382 B1 | * | 4/2002 | Noguchi et al. .......... 73/862.29 |
| 6,428,325 B1 | | 8/2002 | Kurosawa et al. |
| 6,474,146 B2 | * | 11/2002 | Okumura .................... 73/118.1 |
| 2001/0048301 A1 | | 12/2001 | Schlabach et al. |
| 2003/0167858 A1 | * | 9/2003 | Terui et al. ............. 73/862.333 |

* cited by examiner

*Primary Examiner*—Edward Lefkowitz
*Assistant Examiner*—Takisha S Miller
(74) *Attorney, Agent, or Firm*—Oblon, Spivak, McClelland, Maier & Neustadt, P.C.

(57) ABSTRACT

A contact type rotation sensor includes a contact brush having a contact and an electrical resistor disposed for sliding motion relative to the contact. The contact brush provided at a side face of an arm portion with a projecting piece has asymmetric shape and asymmetric weight distribution about its longitudinal axis, and is large in moment of inertia in a direction of torsion. During relative sliding motion, suppressed torsional vibration of the contact occurs not only at natural frequencies but also at dispersed frequencies other than natural frequencies, reducing the sound pressure of sliding sound. A stable contact state is ensured between the contact and the electrical resistor, resulting in improved durability.

9 Claims, 5 Drawing Sheets

ROTATION SENSOR

BACKGROUND OF THE INVENTION

1. Technical Field

The present invention relates to a rotation sensor, and more particularly, to a contact type automotive rotation sensor.

2. Related Art

In recent years, with increased attention to the global environmental problem, reduction of automotive body weight have been made as a measure to reduce automotive emission. By way of example, a conventionally mainstream hydraulically-driven power steering apparatus has been replaced by a power steering apparatus of electrically-driven type which can realize automotive weight reduction by eliminating a hydraulic pump.

However, as compared to a hydraulically-operated power steering apparatus capable of generating a proper assist force solely by use of a mechanical mechanism, an electrically-driven power steering apparatus requires one or more rotation sensors for detecting the steering angle and/or steering torque to enable a computer to calculate an assist force based on steering angle and steering torque.

Rotation sensors for an electrically-driven power steering apparatus are classified into a non-contact type sensor that detects the steering angle and/or torque based on a change in magnetic field caused by steering operation and a contact type sensor that makes detection on the basis of a voltage change caused by steering operation and detected through a contact and an electrical resistor which are disposed for relative sliding motion.

A contact type rotation sensor includes a ring-shaped electrical resistor formed on a surface of a disk-shaped base plate that is rotatable with rotation of a steering handle, and a contact disposed in sliding contact with the electrical resistor. In the rotation sensor, a predetermined voltage is applied across two reference points of the electrical resistor, and a voltage signal is taken out from the contact.

As the steering handle rotates, relative sliding motion occurs between the electrical resistor and the contact, and the voltage signal taken out from the contact varies depending on the distance of relative sliding motion. Thus, the steering angle and/or steering torque can be measured based on the voltage signal.

However, the conventional contact-type rotational sensor has a drawback that sliding sound is produced during the relative sliding motion, giving discomfort to a person.

Furthermore, most components of the rotation sensor are usually fabricated by resin molding at low costs, with an allowable manufacturing error. Thus, the distance between the contact and the base plate can vary normally about ±1 mm though a variation in distance differs depending on the allowable manufacturing error. As a result, there occurs a variation in contact force between the contact and the electrical resistor formed on the base plate to render a connection state therebetween unstable, resulting in poor durability of the rotation sensor.

SUMMARY OF THE INVENTION

An object of the present invention is to provide a contact type rotation sensor capable of suppressing sliding sound and realizing improved durability by ensuring a stable contact state between a contact and an electrical resistor.

The present inventors conducted measurements of sliding sound generated during relative sliding motion between a contact and an electrical resistor of a rotation sensor, and analyzed measurement results with use of a computer, etc. to find the following facts. Specifically, relative sliding motion between a contact and an electrical resistor produces friction that serves as energy source of torsional vibration of the contact. The torsional vibration causes sliding sound. In a case where the contact is formed into a shape particularly liable to make vibration, torsional vibration promotes natural vibration of the contact, producing extremely loud sound at natural frequencies, to thereby give great discomfort to a person. Thus, the present inventors recognized the necessity of finding a shape which makes a contact hard to vibrate, and made concentrated experiences to find such a shape.

Furthermore, the present inventors considered that a proper contact force must be produced between a contact and an electrical resistor in order to establish a stable contact state therebetween to improve the durability of a rotation sensor, and made concentrated experiences based on the recognition that a contact is required to have a proper spring constant to produce a proper contact force.

A rotation sensor according to the present invention, created based on results of the experiences, comprises: a base plate that is rotatable; an electrical resistor formed on a surface of the base plate so as to extend in a rotating direction of the base plate; a holder disposed near the base plate; and a contact member fixed at its one end portion to the holder and provided at another end portion with a contact, the contact member having an arm portion thereof extending between these end portions. Rotation of the base plate causes relative sliding motion between the contact and the electrical resistor, with the contact being in electrical contact with the electrical resistor. The arm portion has asymmetric widthwise weight distribution about a longitudinal axis of the contact member. Information on the rotation of the base plate, produced during the relative sliding motion between the contact and the electrical resistor, is taken out from the contact member in a form of electrical signal.

According to the rotation sensor of the present invention, the contact member is provided with the arm portion that has asymmetric widthwise weight distribution about the longitudinal axis of the contact member, and accordingly torsional vibration of the contact member is suppressed that is generated during relative sliding motion between the electrical resistor and the contact of the contact member, and such torsional vibration may occur not only at natural frequencies but also at dispersed frequencies other than natural frequencies, whereby the sound pressure of sliding sound caused by the relative sliding motion can be reduced.

DETAILED DESCRIPTION

With reference to the appended drawings, a rotation sensor according to a first embodiment of the present invention will be explained.

Figure 1:
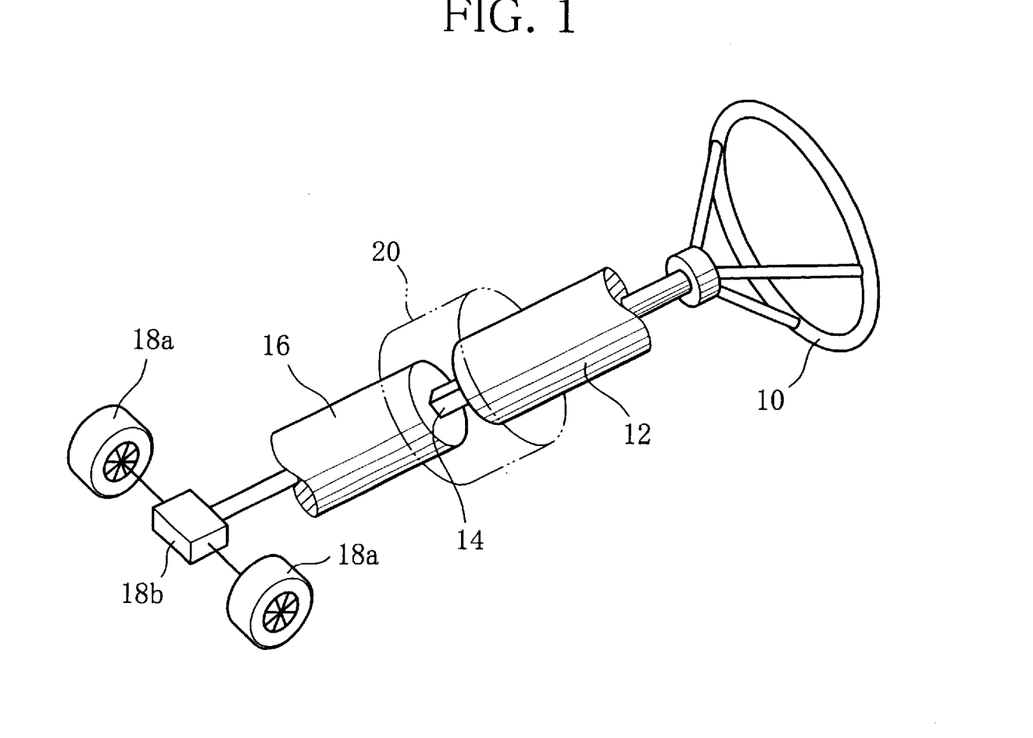
FIG. 1 is a schematic view showing an automotive steering system.

As shown in FIG. 1, an automobile to which the rotation sensor of this embodiment is mounted has a steering handle 10 directly coupled to a column shaft 12. A steering shaft 16 is, on one hand, coupled through a torsion bar 14 to the column shaft 12, and on the other hand, is coupled to an electrically-operated power steering mechanism 18 that accommodates therein a rack and pinion for steering front wheels 19 and an electric motor for assisting a steering operation.

The column shaft 12 and the steering shaft 16 are supported, through bearings and the like, by support members (shown at 38 in FIG. 2) on the side of automotive body, so as to smoothly rotate with rotation of the steering handle 10. The front wheels 19 are steered by the power steering mechanism 18 responsive to rotation of the steering handle.

During the steering operation, the torsion bar 14 coupling the column shaft 12 with the steering shaft 16 receives a reaction force from a road surface, to be twisted. As a result, a rotational deviation occurs between the column shaft 12 and the steering shaft 16.

The rotation sensor 20 of the first embodiment is designed to determine, based on the rotational deviation, a reaction torque applied to the steering shaft 16 and to the steering handle 10. As shown in FIG. 1, the rotation sensor 20 is disposed to saddle between the column shaft 12 and the steering shaft 16.

Figure 2:
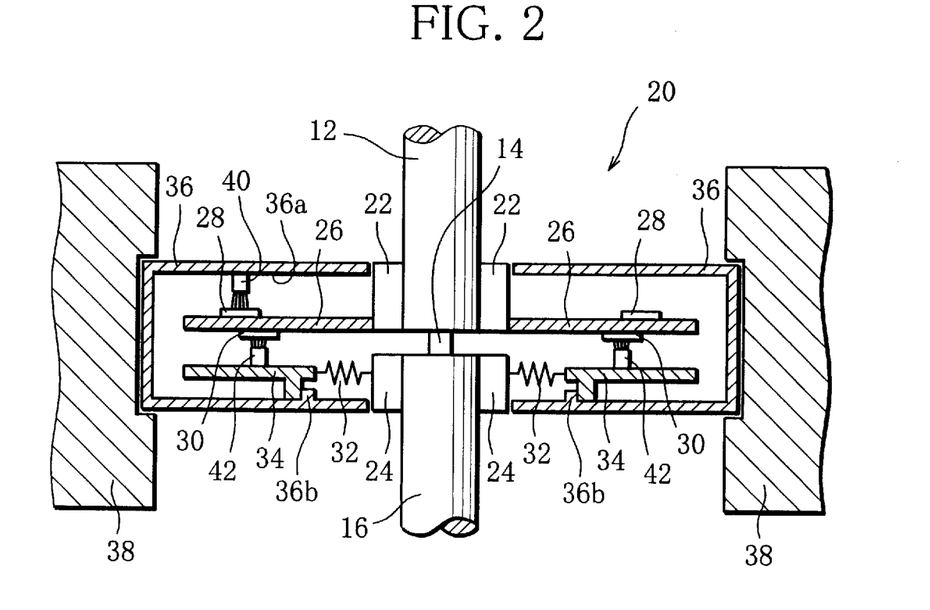
FIG. 2 is a schematic section view showing a rotation sensor according to a first embodiment of the present invention in a state accommodated in the steering system shown in FIG. 1.

More specifically, as shown in FIG. 2, the rotation sensor 20 comprises a steering angle rotor 22 attached to a lower end of the column shaft 12 and a torque rotor 24 attached to an upper end of the steering shaft 16, so that the steering angle rotor 22 and the torque rotor 24 rotate in unison with the column shaft 12 and the steering shaft 16, respectively.

A disk-shaped base plate 26 is attached to an outer periphery of the steering angle rotor 22, so as to rotate in unison with the column shaft 12 and the steering handle 10.

Figure 3:
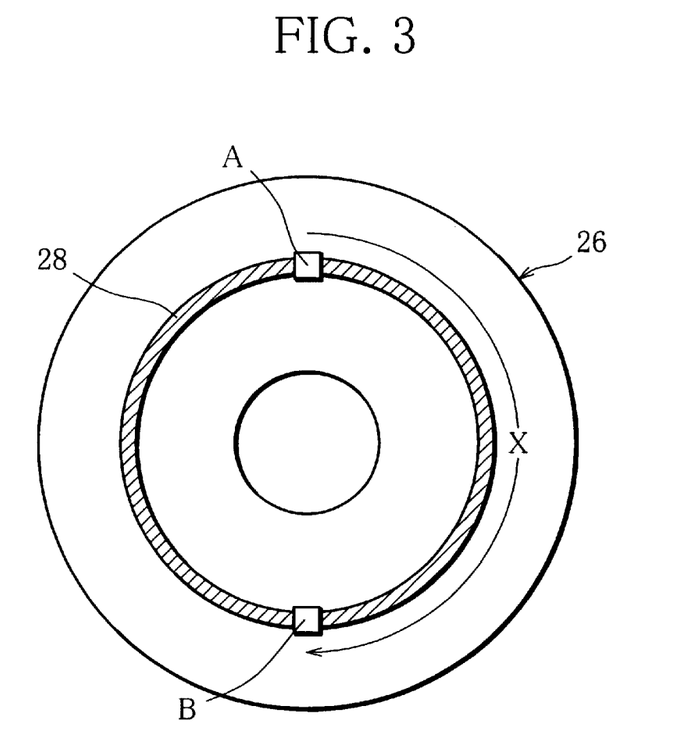
FIG. 3 is a schematic plan view of a base plate of the rotation sensor shown in FIG. 2.

An electrical resistor 28 for steering angle detection is provided on an upper face of the base plate 26, which resistor 28 is formed by electrically conductive resin by using a technique for printed circuit, for instance. As shown in FIG. 3, the electrical resistor 28 is formed into an annular shape and has two reference points A and B that are spaced at a circumferential distance of X on the electrical resistor 28. A predetermined reference voltage is applicable across these reference points A and B.

Referring to FIG. 2, an annular electrical resistor 30 for reaction torque detection is formed on a rear face of the base plate 26, which resistor 30 is similar to the electrical resistor 28 shown in FIG. 3.

Specifically, an annular brush holder 34 is disposed outside the torque rotor 24, with a predetermined gap between the brush holder 34 and the base plate 26, and is coupled to the torque rotor 24 through a compliance disk 32.

The compliance disk 32 has rigidity of connection that is high in the circumferential direction of the brush holder 34 but low in the radial direction thereof. The compliance disk 32 is molded from metal such as stainless steel or plastic such as PBT (poly-butylene telephthalate) to have a shape shown in FIG. 4.

Figure 4:
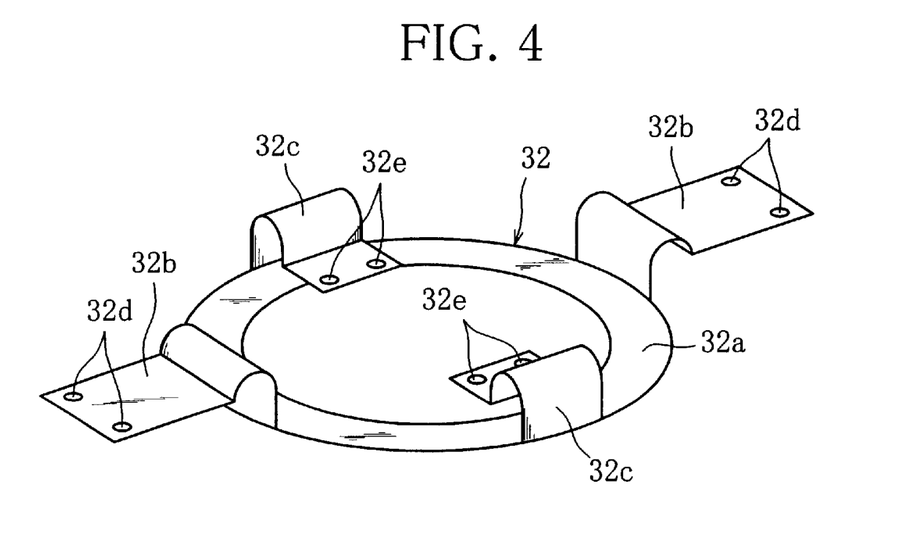
FIG. 4 is a schematic perspective view showing a compliance disk of the rotation sensor.

More specifically, the compliance disk 32 is comprised of a ring 32a, a pair of first elastic pieces 32b, and a pair of second elastic pieces 32c. The elastic pieces 32b, 32c are formed integrally with the ring 32a so as to project from an outer peripheral edge of the ring 32a.

The first elastic pieces 32b are spaced apart from each other so as to diametrically opposite each other. Each of the first elastic pieces 32b includes a rising portion extending upwardly from the ring 32a, a spring portion formed into an arcuate shape to extend radially outward and vertically downward from an upper end of the rising portion, and a mounting portion extending horizontally and radially outward from a lower end of the spring portion. A pair of through holes 32d are formed in the mounting portion.

The mounting portion of each of the first elastic pieces 32b is disposed on and then fixed to an upper face of the brush holder 34 by means of mounting screws (not shown) that are inserted through the through holes 32d and screwed into the brush holder 34.

The second elastic pieces 32c are spaced apart from each other so as to diametrically opposite each other, such that a line connecting the second elastic pieces 32c extends perpendicularly to a line connecting the first elastic pieces 32b. Thus, the first and second elastic pieces 32b and 32c are alternately disposed at equal intervals of 90 deg in the circumferential direction of the ring 32a.

Each of the second elastic pieces 32c includes a rising portion extending upwardly from the ring 32a, a spring portion formed into an arcuate shape so as to extend radially inward and vertically downward from an upper end of the rising portion, and a mounting portion extending horizontally and radially inward from a lower end of the spring portion and formed with a pair of through holes 32e.

The mounting portion of each of the second elastic pieces 32c is disposed on and connected to an upper face of the torque rotor 24 by means of mounting screws (not shown) passing through the through holes 32e and screwed into the torque rotor 24.

The compliance disk 32 has high rigidity, due to the presence of the ring 32a, in the rotating direction of the brush holder 34 and the torque rotor 24, whereas it has low rigidity in the radial direction of the brush holder and the torque rotor due to the presence of the spring portions of the first and second elastic pieces 32b, 32c. Thus, the compliance disk 32 can absorb concentric misalignment of the axes of the column shaft 12 and the steering shaft 16, while positively transmitting the rotation of the steering shaft 16, i.e., the rotation of the torque rotor 24, to the brush holder 34.

Accordingly, as viewed in the radial direction of the compliance disk 32, the compliance disk 32 serves as an elastic coupling member that elastically couples the torque rotor 24 and the brush holder 34, whereby misalignment of the axes of the column shaft 12 and the steering shaft 16 is prevented from affecting on steering angle detection. Meanwhile, the compliance disk 32 is not essentially required for the rotation sensor 20.

The base plate 26, the brush holder 34, and the like are accommodated in a casing 36 fixed to the support member 38 on the automotive body side.

The casing 36 has a ceiling wall 36a spaced from a surface of the base plate 26 at a given distance. The ceiling wall 36a is mounted with a pair of contact brushes 40 for steering angle detection, which are directed downward. Only one of the contact brushes 40 is shown in FIG. 2. Each of the contact brushes 40 has one end thereof fixed to the ceiling wall 36a of the casing 36, and the other end thereof disposed in contact with the electrical resistor 28. Thus, the ceiling wall 36a of the casing 36 serves as a brush holder for the contact brushes 40.

A pair of contact brushes 42 for reaction torque detection are mounted on an upper face of the brush holder 34 so as to be directed upward. These contact brushes 42 have their one ends fixed to the brush holder 34 and the other ends thereof disposed in contact with the electrical resistor 30. An annular projection 36b for guiding the rotating brush holder 34 is formed in a bottom wall of the casing 36.

The contact brushes 40, 42 have the same construction, and therefore, an explanation on the contact brushes 40 will be given with reference to FIG. 5, whereas an explanation on the contact brushes 42 will be omitted.

Figure 5:
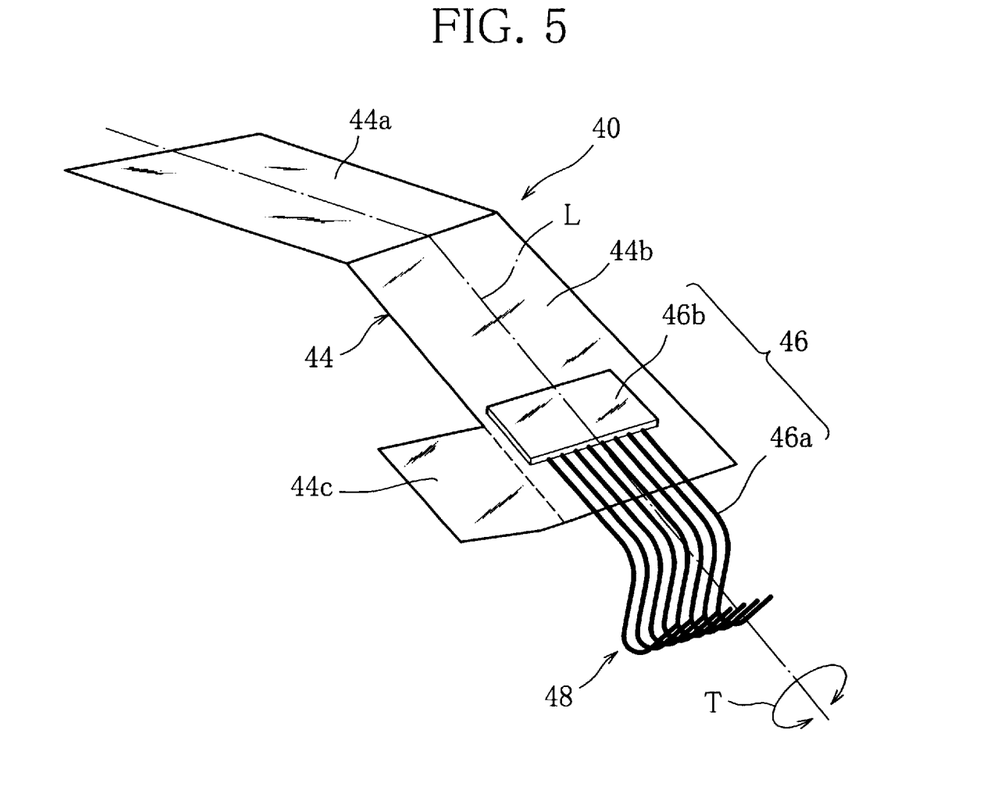
FIG. 5 is a schematic perspective view showing a contact brush of the rotation sensor.

As shown in FIG. 5, the contact brush 40 is provided with a spring arm 44 formed by a thin plate. The spring arm 44 is comprised of a fixture end portion 44a used to mount the spring arm to the brush holder, and a rectangular arm portion 44b having 2.5 mm width and 4 mm length that integrally extends from the fixture end portion 44a.

A projecting piece 44c is formed integrally with a distal end portion of the arm portion 44b, so as to project from a side edge of the arm portion 44b. Further, a brush portion 46 is attached to the distal end portion of the arm portion 44b. The brush portion 46 is comprised of wires 46a and a plate-like wire holder 46b that is fixed by welding to the distal end portion of the arm portion 44b. The wires 46a are supported at their roots by the wire holder 46b.

Distal end portions of the wires 46a are curved into a hook shape, thereby forming curved portions that constitute an electrical contact 48, which is in contact with the electrical resistor 28 and serves as a contact end of the contact brush 40.

The spring arm 44 having the projecting piece 44c is fabricated by e.g., stamping a sheet of beryllium copper having 0.06 mm thick and by bending the stamped sheet so as to define the fixture end portion 44a and the arm portion 44b. The wires 46a of the brush portion 46 are constituted by a septinary alloy.

The spring arm 44 and spring arm portion 44b of the contact brush 40 have a spring constant preferably equal to or less than 0.1 N/mm. A contact force of the contact brush 40 applied to the electrical resistor 28 is preferably within a range from 0.04 N to 0.24 N inclusive. In the present embodiment, the spring constant and the contact force are set to 0.056 N/mm and 0.14 N, respectively.

In FIG. 5, the longitudinal axis L of the spring arm 44 is shown by one-dotted chain line, which passes through the center of the brush portion 46 to pass through the center of the electrical contact 48. The arm portion 44b is asymmetric in shape about the longitudinal axis L since it has the projecting piece 44. Thus, the arm portion 44b is also asymmetric in weight distribution as viewed in the widthwise direction.

The following is an explanation of the operation of the rotation sensor 20 according to the first embodiment.

When the steering handle 10 is rotated, the rotation of the steering handle is transmitted, on one hand, to the base plate 26 through the column shaft 12 and the steering angle rotor 22, thus rotating the base plate 26. The rotation of the steering handle 10 is transmitted, on the other hand, to the power steering mechanism 18 and the torque rotor 24 through the column shaft 12, the torsion bar 14 and the steering shaft 16. Thus, the front wheels 19 are steered by the power steering mechanism 18, and the brush holder 34 rotates in unison with the torque rotor 24 coupled thereto through the compliance disk 32.

During the front wheels 19 being steered, the torsion bar 14 receives a reaction force from a road surface and is twisted, causing a rotational deviation to occur between the column shaft 12 and the steering shaft 16. As a result, a difference is caused between the rotation angle of the base plate 26, fixed to the column shaft 12 through the steering angle rotor 22, and the rotation angle of the brush holder 34 that is coupled to the steering shaft 16 through the compliance disk 32 and the torque rotor 24. The rotation angle difference is within a range from +12 deg to −12 deg.

Figure 6:
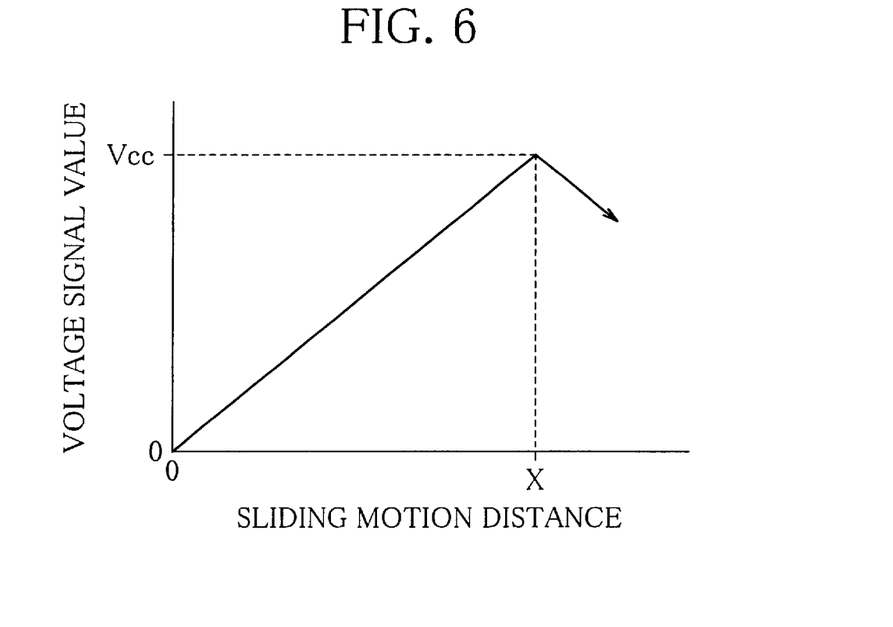
FIG. 6 is a graph showing a relationship between relative sliding distance between an electrical resistor and a contact brush and voltage signal taken out from the contact brush.

With the rotation of the base plate 26, there occurs relative sliding motion between the electrical contacts 48 of the contact brushes 40 fixed to the casing 36 and the annular electrical resistor 28 formed on the base plate 26, under condition that voltages of zero and Vcc volts are applied individually to two reference points A, B (refer to FIG. 3) of the electrical resistor 28. Relative sliding motion of the electrical contact 48 relative to the electrical resistor 28 from the reference point A toward the reference point B in the circumferential direction of the electrical resistor 28 causes the voltage signal taken out from the contact brush 40 to increase from zero volts toward Vcc volts in proportion to the distance of sliding motion, as shown in FIG. 6, as understood from the principle of potentiometer. On the other hand, relative sliding motion of the electrical contact 48 of the contact brush 40 from the reference point B toward the reference point A causes the output voltage of the contact brush 40 to decrease from Vcc volts toward zero volts.

The voltage signals from the contact brushes 40 are supplied to an external arithmetic processing device (not shown) through signal cables (not shown), and the rotation angle of the steering angle rotor 22 or the steering angle of the steering handle 10 is calculated by the arithmetic processing device. The voltage signals from the contact brushes 40 have a predetermined phase difference therebetween, from which difference the arithmetic processing device detects the rotating direction of the steering handle 10.

With the rotation of the steering handle 10, the brush holder 34 rotates, accompanied with a rotational angle difference relative to the base plate 26. In other words, electrical contacts of contact brushes 42 held by the brush holder 34 make sliding motions relative to an annular electrical resistor 30 formed on the base plate 26. The voltage signals taken out from the contact brushes 42, which vary depending on the distance of sliding motion or the rotation angle of the brush holder 34, are supplied to the arithmetic processing device. In the processing device, a rotational deviation between the steering angle rotor 22 and the torque rotor 24, i.e., reaction torque, is calculated based on the two output signals of the contact brushes 42.

Figure 7:
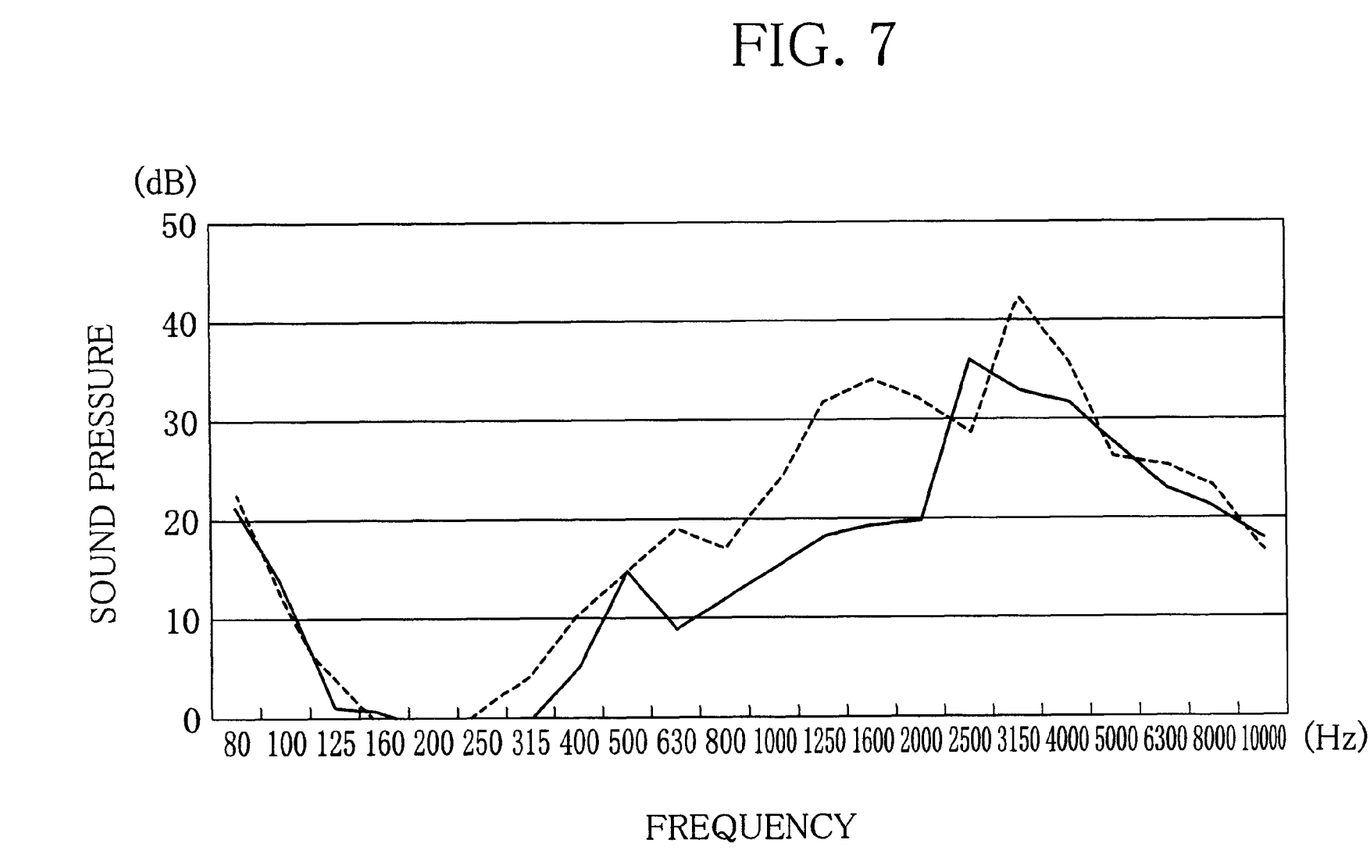
FIG. 7 is a graph showing sound pressure of sliding sound generated in the rotation sensor shown in FIG. 5 in comparison with sound pressure in a conventional rotation sensor.

In FIG. 7, the solid line indicates results of measurement showing a relation between sound pressure and vibration frequency caused by vibration of the contact brush 40 or 42 of the rotation sensor, which vibration was caused during relative sliding motion of the contact brush relative to an electrical resistor. The dotted line shown in FIG. 7 indicates results of similar measurement for a rotation provided with conventional contact brushes which have the same construction as the contact brushes 40, 42 except that they are provided with no projection pieces 44c.

As apparent from FIG. 7, the sound pressure of sliding sound observed in an audible sound frequency range from 300 Hz to 1600 Hz is lower in the rotation sensor 20 having contact brushes 40 or 42 than in the rotation sensor having conventional contact brushes.

Specifically, the contact brush receives friction energy during the relative sliding motion. As for the conventional contact brush having a spring arm whose arm portion is symmetric in shape about its longitudinal axis, it is considered that friction energy tends to cause torsional vibration T in the arm portion around the longitudinal axis thereof, as shown by the arrow in FIG. 5. The torsional vibration T has a frequency such as to promote principal vibration of the arm portion in an audible sound frequency range, thus extremely increasing the sound pressure at the natural vibration frequency.

On the other hand, the contact brush 40 or 42 shown in FIG. 5 is provided at the arm portion 44b with the projecting piece 44c, so that the arm portion 44b has an asymmetric shape about its longitudinal axis, resulting in having asymmetric weight distribution in the widthwise direction. This increases the moment of inertia of the arm portion 44b in a direction of torsion around the longitudinal axis L, thus suppressing the torsional vibration T of the arm portion 44b.

Even when the torsional vibration T causes principal vibrations in the arm portion 44b, the projecting piece 44c makes it possible to cause such principal vibrations of the arm portion 44b to have frequencies falling outside the audible sound frequency range. In addition, it is possible for torsional vibration T of the arm portion 44b to occur not only at natural frequencies but also at dispersed vibration frequencies other than natural frequencies. As a consequence, the contact brush 40 or 42 makes it possible to reduce the sound pressure of sliding sound, as a whole, in the audible sound frequency range, and to reduce peak values of sound pressure at natural frequencies.

As for the contact brushes 40, 42 whose arm portions 44b have spring constant of 0.056 N/mm to produce a contact force of 0.14 N (central value) applied to the electrical resistors 28, 30, a stable contact state is maintained between the contact brushes 40, 42 and the electrical resistors 28, 30 to thereby realize excellent durability, even when there is variation (normally, about ±1 mm) in distances between a ceiling wall 36a of a casing 36 and a surface of a base plate 26 and between a rear face of the base plate 26 and an upper face of the brush holder 34.

Next, a rotation sensor according to a second embodiment of this invention will be explained.

The rotation sensor of this embodiment is the same in construction as that shown in FIG. 2 except for contact brushes. Like numerals are used to denote like elements similar to those of FIG. 2, and explanations of these elements are omitted.

Figure 8:
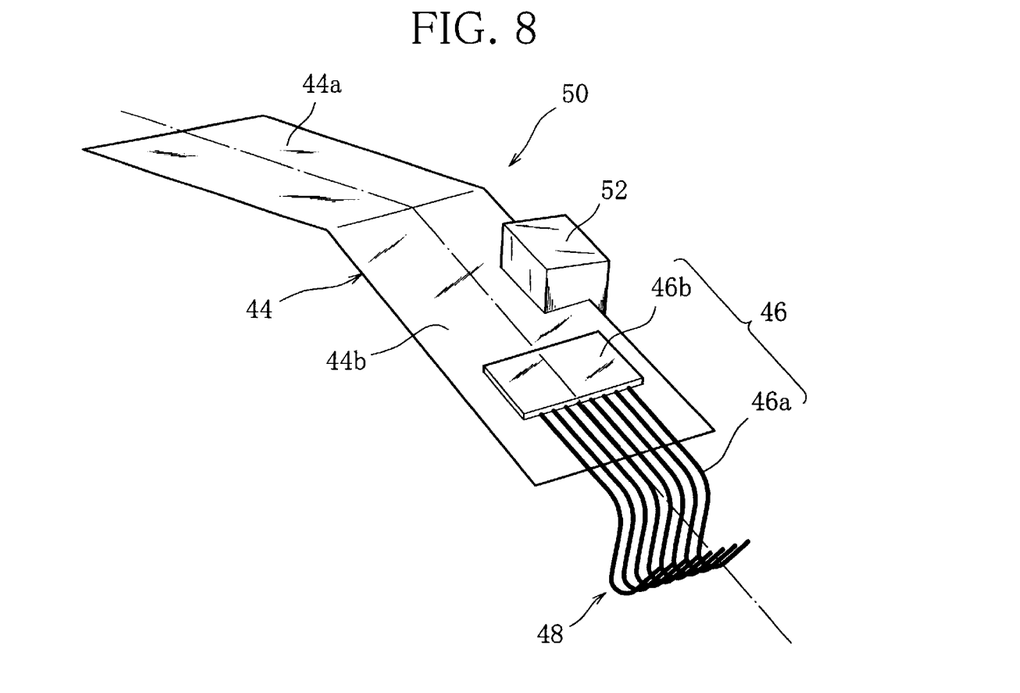
FIG. 8 is a schematic perspective view showing a contact brush of a rotation sensor according to a second embodiment of the present invention.

As shown in FIG. 8, a contact brush 50 in this embodiment is provided at a side edge of an arm portion 44b with an epoxy resin member 52 serving as an asymmetrizing element, instead of the projecting piece 44c shown in FIG. 5. Except for such a difference, the contact brush 50 can be fabricated in the same manner as the contact brushes 40, 42 shown in FIG. 5.

Unlike the first embodiment, a spring arm 44 of the contact brush 50 is fabricated by stamping and bending a sheet of phosphor bronze of 1 mm thick, and wires 46a of a brush portion 46 are each constituted by a hexinary alloy.

The rotation sensor of the second embodiment can achieve similar advantages as those attained by the first embodiment, since the arm portion 44b of the contact brush 50 has an asymmetric shape about its longitudinal axis L as viewed in the widthwise direction because of the presence of the epoxy resin member 52, thus having a weight distribution that is asymmetric in the widthwise direction.

Next, a rotation sensor according to a third embodiment of this invention will be explained.

The rotation sensor of this embodiment has the same construction as that shown in FIG. 2 except for contact brushes.

Figure 9:
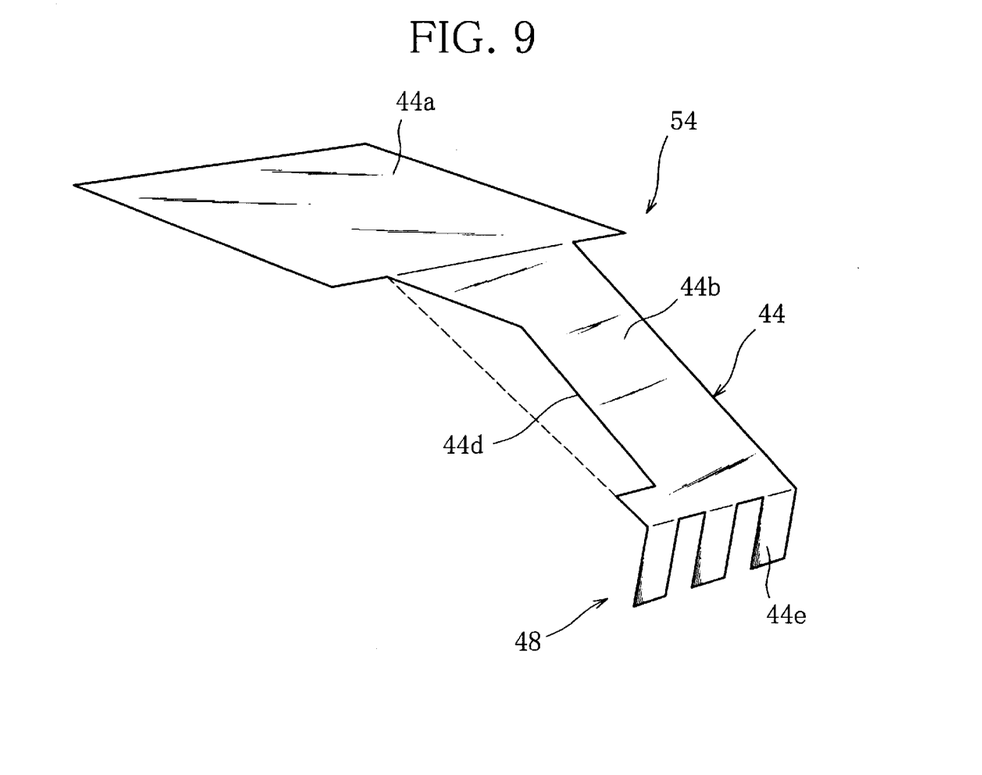
FIG. 9 is a schematic perspective view showing a contact brush of a rotation sensor according to a third embodiment of the present invention.

As shown in FIG. 9, a contact brush 54 of the rotation sensor of the third embodiment is provided at a side edge of an arm portion 44b of a spring arm 44 with a notched portion serving as an asymmetrizing element. A fixture end portion 44a of the spring arm 44 has a width that is wider than that of the arm portion 44b.

The arm portion 44b is formed at its distal end with a brush portion 44e integral therewith. The brush portion 44e is formed into a comb-like shape having bent teeth thereof constituting an electrical contact 48.

The spring arm 44 comprised of an fixture end portion 40a, arm portion 40b and brush portion 44e can be fabricated from a rectangular sheet of beryllium copper having 0.08 mm thick by stamping and bending such a sheet.

The rotation sensor of the third embodiment can achieve advantages similar to those achieved by the first embodiment since the arm portion 44b of the contact brush 54 is formed into an asymmetric shape about the longitudinal axis thereof as viewed in the widthwise direction to realize asymmetric widthwise weight distribution.

In addition, the contact brush 54 having the brush portion 44e that is formed integrally with the arm portion 44b can be fabricated with ease at low costs, as compared to the contact brushes 40, 42 and 50 each having a brush portion 46 that is constituted by wires 46a.

The rotation sensor of this invention is not limited to the first to third embodiments and may be modified variously.

For instance, the projecting piece 44c, epoxy resin member 52 or notched portion 44d is provided in each of the first to third embodiments in order to form the arm portion 44b into an asymmetric shape, but other means may be used to obtain an asymmetrically shaped arm portion 44b. Alternatively, respective portions of the arm portion 44b may be formed by different materials to have asymmetric weight distribution.

Although cases where the rotation sensor for electrically-driven automotive power steering apparatus have been explained in the first to third embodiments, the present invention is applicable to a variety of rotation sensors, such as for example, a rotation sensor for a robot arm, for detecting a rotation angle of a rotary shaft, torque between two shafts arranged for relative rotation, or the like.

What is claimed is:

1. A rotation sensor comprising:

a base plate that is rotatable;

an electrical resistor formed on a surface of said base plate so as to extend in a rotating direction of said base plate;

a holder disposed near said base plate; and a contact member fixed at one end portion thereof to said holder and provided at another end portion with a contact, said contact member having an arm portion thereof extending between these end portions of said contact member, wherein rotation of said base plate causes relative sliding motion between said contact and said electrical resistor, with said contact being in electrical contact with said electrical resistor, said arm portion has asymmetric widthwise weight distribution about a longitudinal axis of said contact member, and information on the rotation of said base plate, produced during the relative sliding motion between said contact and said electrical resistor, is taken out from said contact member in a form of electrical signal.

2. The rotation sensor according to claim 1, wherein said arm portion has a spring constant equal to or less than 0.1 N/mm, and said contact produces a contact force applied to said electrical resistor, the contact force falling within a range from 0.1 N to 0.24 N inclusive.

3. A rotation sensor comprising:

first and second rotors individually attached to first and second rotary shafts so as to be rotatable in unison therewith, the first and second rotary shafts being coupled through a torsion bar that allows a rotational difference between the first and second rotary shafts;

a base plate rotatable in unison with said first rotor;

first and second electrical resistors individually formed on first and second faces of said base plate so as to extend in a rotating direction of said base plate;

a first holder fixedly disposed on a side of the first face of said base plate;

a second holder disposed on a side of the second face of said base plate so as to be rotatable in unison with said second rotor;

a first contact member fixed at its one end portion to said first holder and provided at another end portion with a contact, said first contact member having an arm portion thereof extending between these end portions, rotation of said base plate causing relative sliding motion between the contact and said first electrical resistor, with the contact being in electrical contact with said first electrical resistor; and a second contact member fixed at its one end portion to said second holder, said second contact member having another end portion thereof provided with a contact and an arm portion thereof extending between the end portions of said second contact member, rotation of said base plate causing relative sliding motion between the contact and said second electrical resistor, accompanied with a rotational difference between the said base plate and said second holder, with the contact being in electrical contact with said second electrical resistor, wherein an angle of rotation of said first rotor, caused by the relative sliding motion between the contact of said first contact member and said first electrical resistor, is taken out from said first contact member in a form of electrical signal, an angle of rotation of said second rotor, caused by the relative sliding motion between the contact of said second contact member and said second electrical resistor, is taken out from said second contact member in a form of electrical signal, and the arm portion of at least one of said first and second contact members has asymmetric widthwise weight distribution about a longitudinal axis of the arm portion.

4. The rotation sensor according to claim 3, wherein the arm portion having the asymmetric weight distribution has a spring constant that is equal to or less than 0.1 N/mm, and the contact that is provided in the contact member including the arm portion having the asymmetric weight distribution is in contact with a corresponding one of said first and second electrical resistors with a contact force varying within a range from 0.04 N to 0.24 N inclusive.

5. The rotation sensor according to claim 1, wherein the arm portion having the asymmetric weight distribution is provided with an asymmetrizing element.

6. The rotation sensor according to claim 5, wherein the asymmetrizing element is comprised of a projecting piece formed integrally with a distal end portion of said arm portion having the asymmetric weight distribution.

7. The rotation sensor according to claim 5, wherein the asymmetrizing element is comprised of a resin body provided at a side edge of said arm portion having the asymmetric weight distribution.

8. The rotation sensor according to claim 5, wherein the asymmetrizing element is comprised of a notch formed at a side edge of said arm portion having the asymmetric weight distribution.

9. The rotation sensor according to claim 3, wherein the arm portion having the asymmetric weight distribution is provided with an asymmetrizing element.

* * * * *